US012776441B2

(12) United States Patent
Kuo et al.

(10) Patent No.: US 12,776,441 B2
(45) Date of Patent: Oct. 27, 2026

(54) COUPLED INDUCTOR WITH ADJUSTABLE LEAKAGE INDUCTANCE

(71) Applicant: ITG Electronics, Inc., Elmsford, NY (US)

(72) Inventors: Martin Kuo, Elmsford, NY (US); Nanhai Zhu, Elmsford, NY (US)

(73) Assignee: ITG ELECTRONICS, INC., Elmsford, NY (US)

( * ) Notice: Subject to any disclaimer, the term of this patent is extended or adjusted under 35 U.S.C. 154(b) by 687 days.

(21) Appl. No.: 18/223,611

(22) Filed: Jul. 19, 2023

(65) Prior Publication Data

US 2025/0029779 A1 Jan. 23, 2025

(51) Int. Cl.
*H01F 29/10* (2006.01)
*H01F 27/24* (2006.01)
*H01F 27/28* (2006.01)

(52) U.S. Cl.
CPC ............. *H01F 29/10* (2013.01); *H01F 27/24* (2013.01); *H01F 27/28* (2013.01)

(58) Field of Classification Search
CPC ........... H01F 29/10; H01F 27/24; H01F 27/28
See application file for complete search history.

(56) References Cited

U.S. PATENT DOCUMENTS 5,414,401 A * 5/1995 Roshen ..................... H01F 3/14 336/200
2011/0025445 A1* 2/2011 Lai ............................ H01F 3/10 336/221
2015/0255204 A1* 9/2015 Yu ........................... H01F 17/06 336/220
2016/0314888 A1* 10/2016 Zheng ....................... H01F 3/10
2018/0308615 A1* 10/2018 Tsai ......................... H01F 27/24
2020/0312595 A1* 10/2020 Rippel ................... H03K 17/51
2022/0208439 A1* 6/2022 Hong .................... H01F 27/306
2023/0083589 A1* 3/2023 Hsieh .................... H01F 27/306 336/220

FOREIGN PATENT DOCUMENTS

CN 212750576 U * 3/2021

* cited by examiner

*Primary Examiner* — Malcolm Barnes
(74) *Attorney, Agent, or Firm* — Li & Cai Intellectual Property (USA) Office

(57) ABSTRACT

A coupled inductor with adjustable leakage inductance is provided. The coupled inductor includes a first magnetic element, a second magnetic element, and two coil assemblies. The first magnetic element includes a first magnetic plate and at least two first magnetic core columns, which are disposed on the first magnetic plate and spaced apart along an arrangement direction. The second magnetic element is coupled to the first magnetic element. The second magnetic element includes a second magnetic plate and at least two second magnetic core columns, which are disposed on the second magnetic plate and spaced apart along the arrangement direction. The second magnetic core columns are respectively coupled to the first magnetic core columns to form magnetic core column bodies. The coil assemblies have a same quantity as that of the magnetic core column bodies, and the coil assemblies are respectively sleeved around the magnetic core columns.

5 Claims, 10 Drawing Sheets

COUPLED INDUCTOR WITH ADJUSTABLE LEAKAGE INDUCTANCE

FIELD OF THE DISCLOSURE

The present disclosure relates to an inductor structure, and more particularly to a coupled inductor with adjustable leakage inductance.

BACKGROUND OF THE DISCLOSURE

An inductor is a kind of passive component, with the functions of filtering and removing noise, suppressing instantaneous current, reducing EMI and power conversion. The main function of the inductor is to prevent electromagnetic wave interference, shield electromagnetic radiation, and filter noise in current. The inductor has been widely applied to power supplies, monitors, switches, motherboards, scanners, telephones, modems, etc.

Due to electromagnetic induction, the current change in one wire causes the electromotive force to pass through one end of another wire. An interaction between the two conductors is called mutual inductance coupling, or magnetic coupling. One of the most important applications of the mutual inductance coupling is a voltage converter.

When a magnetic flux in the inductor of the voltage converter reaches a maximum value, a magnetic core of the inductor is saturated. At this time, the magnetic induction in the magnetic core no longer increases with the increase of the coil current, and the voltage converter loses the function of energy exchange. In a continuous transmission of current, since the energy cannot be converted, the energy will be lost in the internal damping of the coil, and when the loss reaches a certain level, the voltage converter will eventually be damaged.

In the conventional technology, a directionality of an electromagnetic circuit is often limited due to a structural design of the inductor, and the selection of the electromagnetic circuit is inflexible. Therefore, how to improve the structural design to improve the inductance used in electronic devices (such as voltage converters) and provide a variety of electromagnetic circuit options to overcome the foregoing defects has become one of the important issues to be solved in the related field.

SUMMARY OF THE DISCLOSURE

In response to the above-referenced technical inadequacies, the present disclosure provides a coupled inductor with adjustable leakage inductance and reduced loss in view of the deficiencies of the prior art. According to certain embodiments, the coupled inductor with adjustable leakage inductance is used in a voltage converter, which can improve electromagnetic characteristics, increase power of the voltage converter and reduce an internal energy loss. According to certain embodiments, a user can also change an electromagnetic circuit by controlling the leakage inductance to meet practical requirements.

In one aspect, the present disclosure provides a coupled inductor with adjustable leakage inductance, which comprises a first magnetic element, a second magnetic element, and at least two coil assemblies. The first magnetic element includes a first magnetic plate and at least two first magnetic core columns. The at least two first magnetic core columns are disposed on the first magnetic plate and spaced apart along an arrangement direction. The second magnetic element is coupled to the first magnetic element, the second magnetic element includes a second magnetic plate and at least two second magnetic core columns. A quantity of the second magnetic core columns is the same as a quantity of the first magnetic core columns. The at least two second magnetic core columns are disposed on the second magnetic plate, and are spaced apart along the arrangement direction, and are respectively coupled with the at least two first magnetic core columns to form at least two magnetic core column bodies. A quantity of the coil assemblies is the same as a quantity of the at least two magnetic core column bodies, and the at least two coil assemblies are respectively sleeved around the at least two magnetic core column bodies. A coupling position between the second magnetic core column and a corresponding on of the first magnetic core column to which the second magnetic core column is coupled has a gap.

In certain embodiments, the coupled inductor with adjustable leakage inductance further includes a top magnetic plate, and the top magnetic plate is correspondingly disposed above the first magnetic element and the second magnetic element.

In certain embodiments, a coupled inductor with adjustable leakage inductance further comprises a third magnetic plate and a fourth magnetic plate, the third magnetic plate is correspondingly disposed on a right side of the first magnetic plate and a right side of the second magnetic plate; and the fourth magnetic plate is disposed on a left side of the first magnetic element and a left side of the second magnetic element.

In certain embodiments, a coupled inductor with adjustable leakage inductance further comprises a third magnetic plate, a fourth magnetic plate, and a top magnetic plate. The third magnetic plate is correspondingly disposed on a right side of the first magnetic element and a right side of the second magnetic element; the fourth magnetic plate is correspondingly disposed on the left side of the first magnetic element, and a magnetic frame is formed by the a left side of second magnetic element, the first magnetic plate, the second magnetic plate, the third magnetic plate and the fourth magnetic plate; and the top magnetic plate is disposed above the magnetic frame.

In certain embodiments, a coil of each of the at least two coil assemblies is a flat coil or a circular coil.

One of the beneficial effects of the present disclosure is that, in the coupled inductor with adjustable leakage inductance provided by the present disclosure, by virtue of "the second magnetic core column being coupled to the first magnetic core column to form the magnetic core column body, and the coupling position having the gap," and "the gaps being correspondingly formed between the top magnetic plate, the first magnetic plate, the second magnetic plate, the third magnetic plate and the fourth magnetic plate", the coupled inductor with adjustable leakage inductance has the gap that can be adjusted in size, so as to affect the magnetic resistance of the coupled inductor, the effective magnetic permeability of the magnetic core, the leakage inductance, the magnetic induction current, the directionality of the electromagnetic circuit, and other electromagnetic factors. Therefore, the power and function of the applied electronic products can be improved, and a functional loss inside the electronic product can be reduced.

In order to further understand the features and technical content of the present disclosure, please refer to the following detailed description and drawings of the present disclosure. However, the drawings provided are only for reference and description, and are not intended to limit the present disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
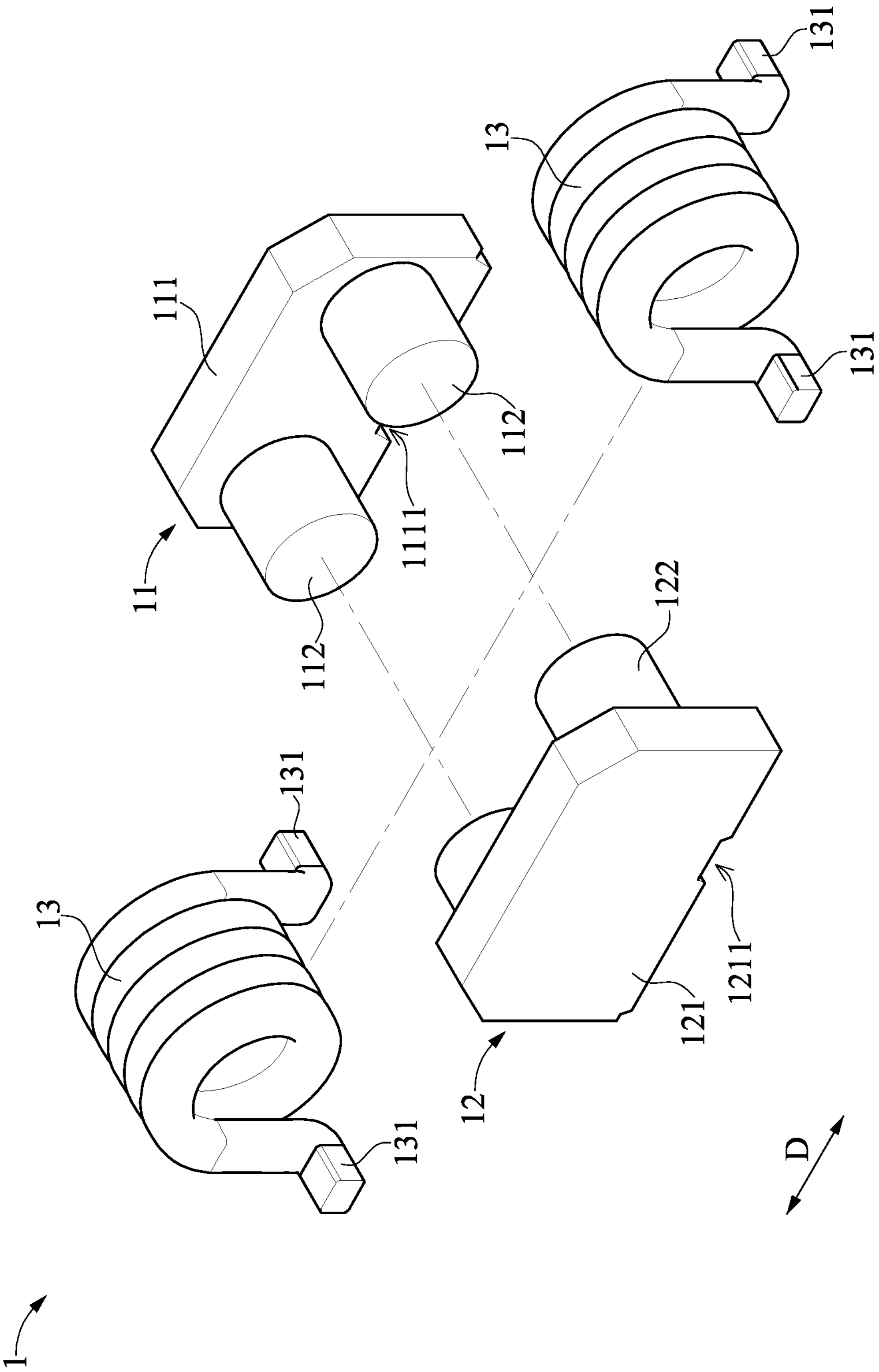
FIG. 1 is a schematic exploded view of a coupled inductor with adjustable leakage inductance according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

First Embodiment

Figure 2:
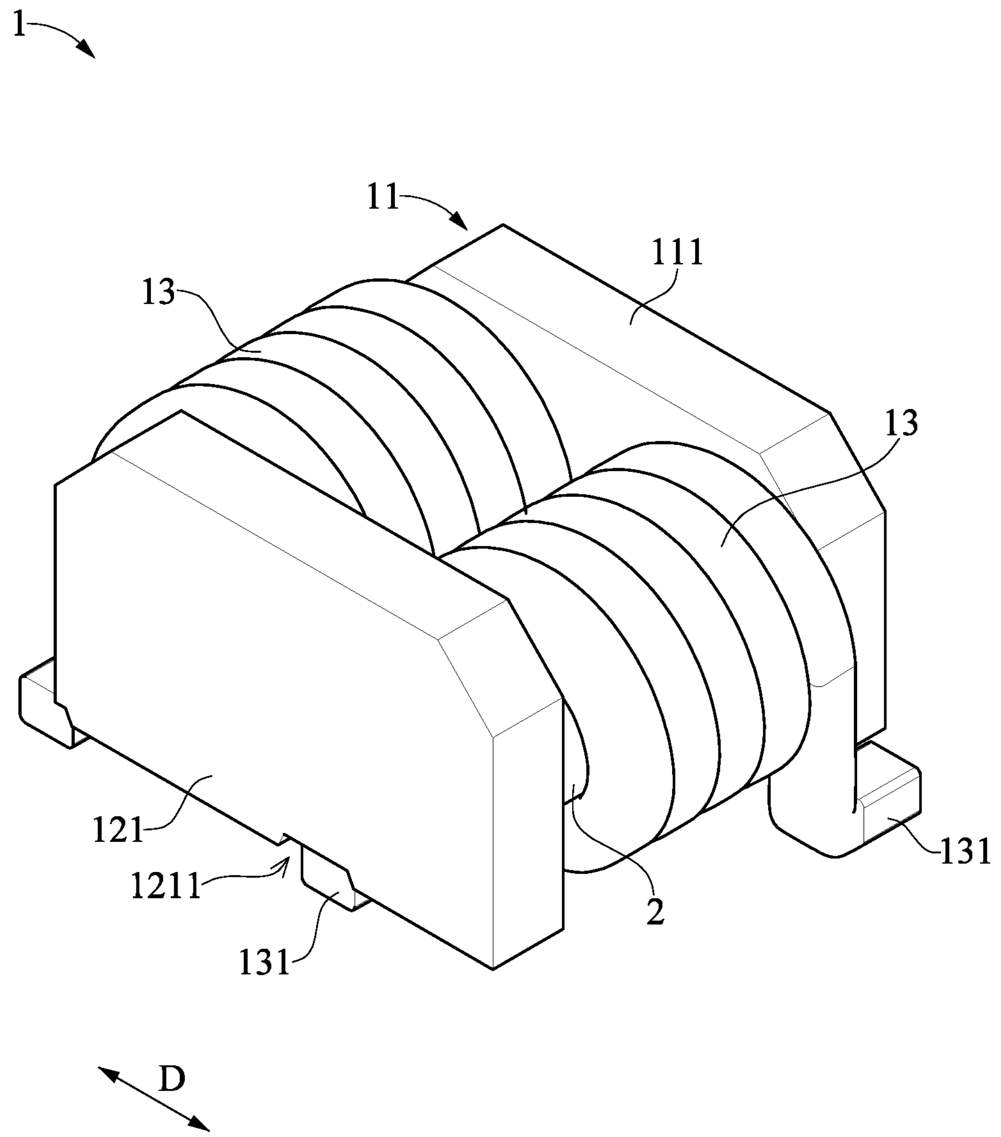
FIG. 2 is an assembled view of FIG. 1.
Figure 3:
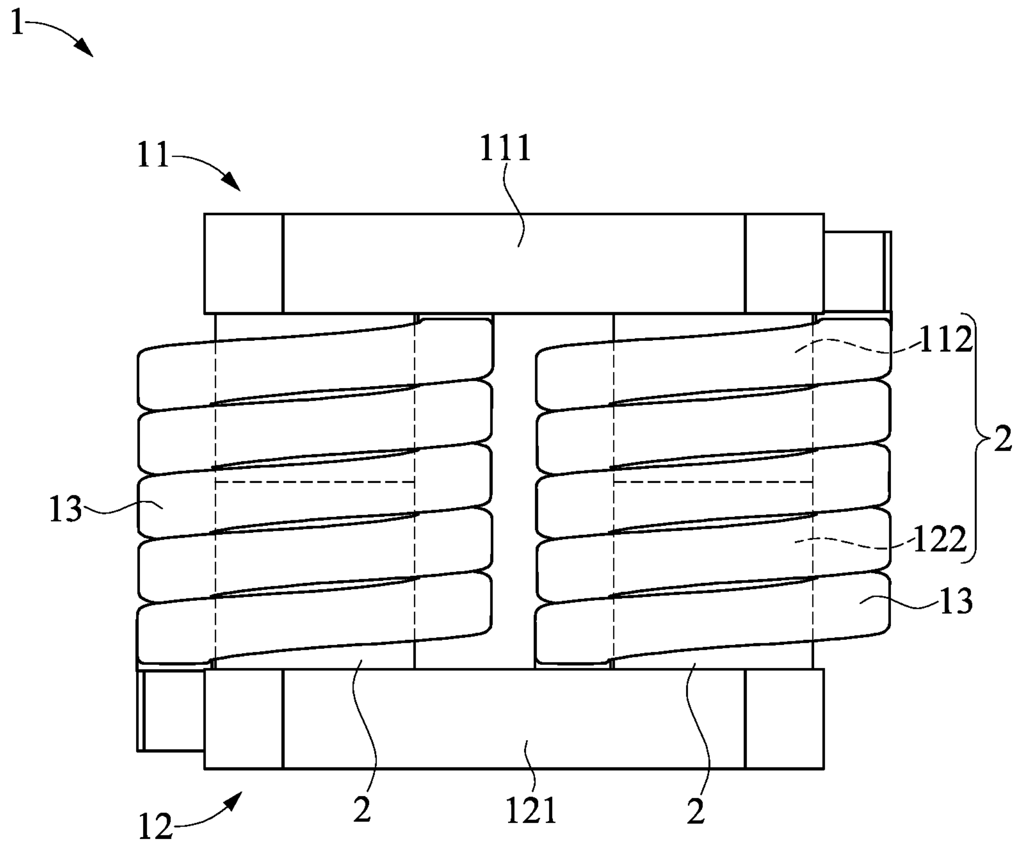
FIG. 3 is a top view of FIG. 2.

Referring to FIG. 1 to FIG. 3, FIG. 1 is a schematic exploded view of a coupled inductor with adjustable leakage inductance 1 according to a first embodiment of the present disclosure. FIG. 2 is an assembled view of FIG. 1. FIG. 3 is a top view of FIG. 2. The coupled inductor with adjustable leakage inductance 1 includes a first magnetic element 11, a second magnetic element 12, and at least two coil assemblies 13. The first magnetic element 11 includes a first magnetic plate 111 and at least two first magnetic core columns 112. The first magnetic core columns 112 are disposed on the first magnetic plate 111 and spaced apart along an arrangement direction D. The second magnetic element 12 is coupled to the first magnetic element 11. The second magnetic element 12 includes a second magnetic plate 121 and at least two second magnetic core columns 122. A quantity of the at least two second magnetic core columns 122 is the same as a quantity of the at least two first magnetic core columns 112. The at least two second magnetic core columns 122 are disposed on the second magnetic plate 121 and spaced apart along the arrangement direction D. The at least two second magnetic core columns 122 are respectively coupled to the at least two first magnetic cores column 112 to form at least two magnetic core column bodies 2. A quantity of the at least two coil assemblies 13 is the same as a quantity of the at least two magnetic core column bodies 2, and the at least two coil assemblies 13 are respectively sleeved around the at least two magnetic core column bodies 2.

According to the embodiment shown in FIG. 1, each of the magnetic core column bodies 2 formed by the first core columns 112 and the second magnetic core columns 122 is a cylinder. According to certain embodiments, each of the magnetic core column bodies 2 formed by the first core columns 112 and the second magnetic core columns 122 is a square column. A material of each of the first magnetic core columns 112, the second magnetic core columns 122 and the magnetic core column bodies 2 can be ferrite or a soft magnetic material, but is not limited thereto. The coil assemblies 13 are respectively sleeved around the magnetic core column bodies 2, and the coupled inductor with adjustable leakage inductance 1 is arranged on a circuit board. When a current flows through, an inductive coupling can be generated between the coil assemblies 13. As shown in FIG. 3, a coil is a flat coil, and each of two ends of the coil assemblies 13 has a pin 131. A bottom of each of the first magnetic plate 111 and the second magnetic plate 121 has a notch 1111, 1211, and the two pins 131 are respectively disposed in the notches 1111, 1211. The design for the pins 131 and the notches 1111, 1211 is beneficial for disposing the coupled inductor with adjustable leakage inductance 1 on an electrical substrate (such as the circuit board). According to certain embodiments, the coil can be a circular coil, but the present disclosure is not limited thereto, and there are different choices depending on the needs of a user. In certain embodiments, the coil of each of the coil assemblies 13 includes or is selected from copper (Cu), aluminum (Al), silver (Ag), or alloys thereof. In addition, according to certain embodiments, the coil of each of the coil assemblies 13 can also include other conductive materials.

Second Embodiment

Figure 4:
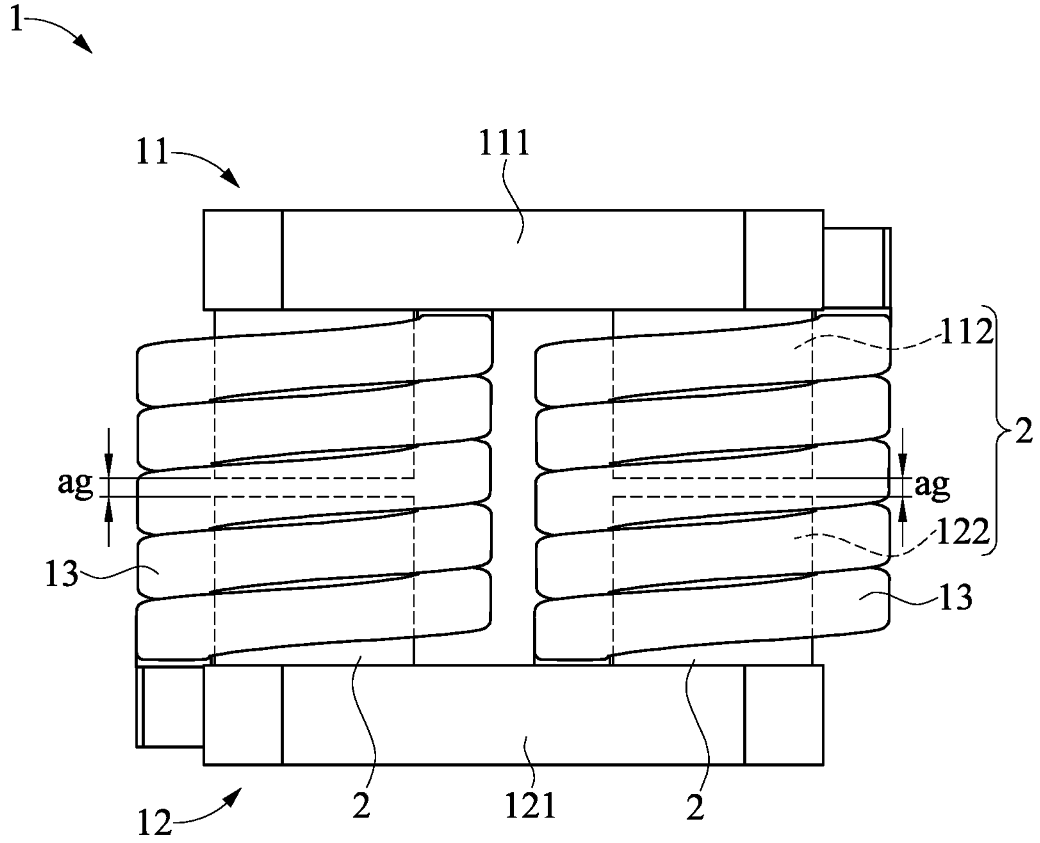
FIG. 4 is a schematic top view of a coupled inductor with adjustable leakage inductance according to a second embodiment of the present disclosure.

Referring to FIG. 4, FIG. 4 is a schematic top view of a coupled inductor with adjustable leakage inductance 1 according to a second embodiment of the present disclosure. According to the embodiment shown in FIG. 4, a coupling position between the second magnetic core column 122 and a corresponding one of the first magnetic core column 112 to which the second magnetic core column 122 is coupled has a gap ag. The gap ag filled with air is referred to an air gap. In certain embodiments, the gap ag is filled with a plastic material, such as a Mylar sheet or a polyester film (PET film). In addition, according to certain embodiments, the gap ag is filled with curing glue. As shown in FIG. 4, each of the two magnetic core column bodies 2 has a gap. A filler in the gap has functions of reducing an effective magnetic permeability of a magnetic core, increasing saturation current and storage capacity. In addition, a size of the gap also affects a leakage inductance and changes a direction of an electromagnetic circuit. A width of the gap is not limited in the present disclosure, and can be determined according to depends on user's requirements for electricity (such as the required leakage inductance and the direction of the required electromagnetic circuit). According to certain embodiments, the size of the gap ag is determined according to a length of an electromagnetic circuit defined by the magnetic core column bodies 2, the first magnetic plate 111, and the second magnetic plate 121.

Third Embodiment

Figure 5:
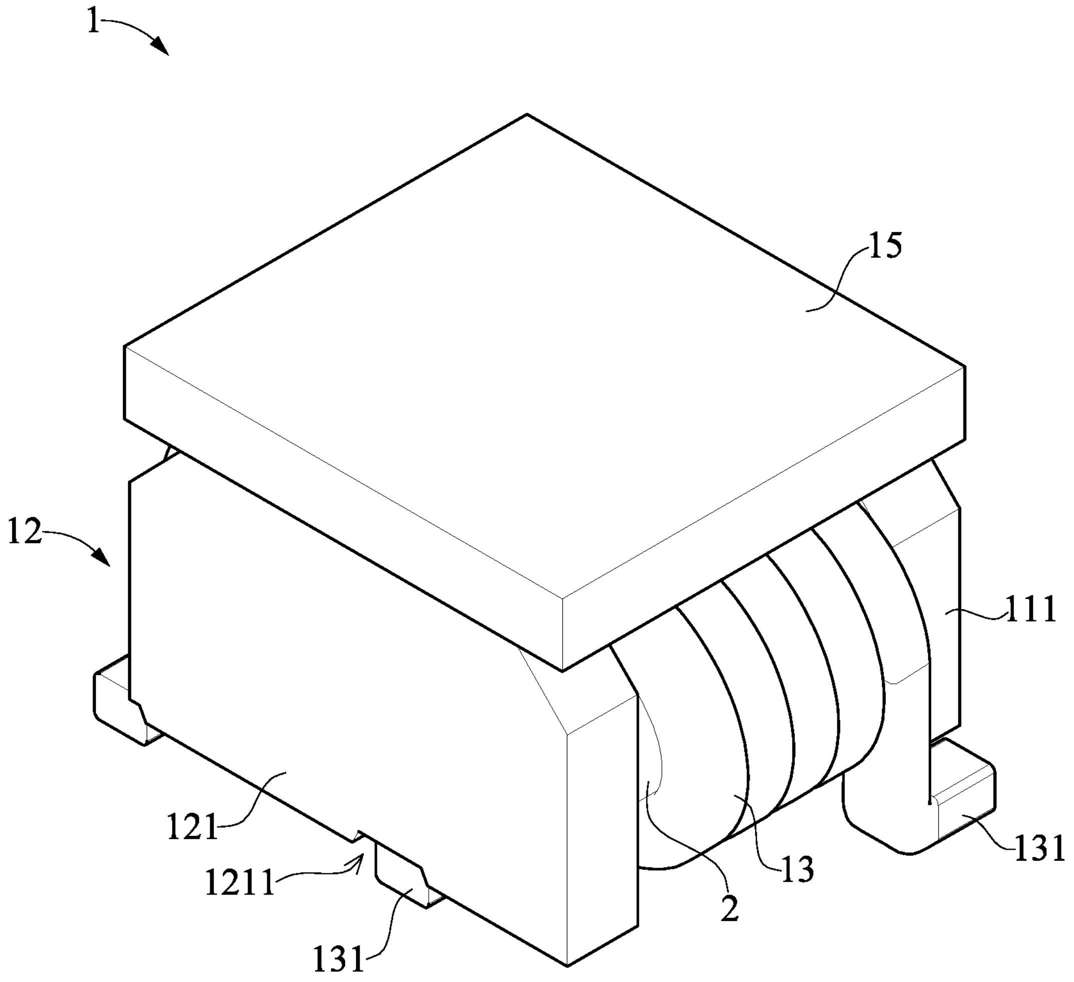
FIG. 5 is a schematic external view of a coupled inductor with adjustable leakage inductance according to a third embodiment of the present disclosure.

Referring to FIG. 5, FIG. 5 is a schematic external view of a coupled inductor with adjustable leakage inductance 1 according to a third embodiment of the present disclosure. According to the present embodiment, the coupled inductor with adjustable leakage inductance 1 further includes a top magnetic plate 15 correspondingly disposed above the first magnetic element 11 and the second magnetic element 12. According to certain embodiments, the top magnetic plate 15 is correspondingly connected to the first magnetic plate 111 and the second magnetic plate 121. In addition, according to certain embodiments, the top magnetic plate 15 and the first magnetic plate 111 have the gap therebetween, and the top magnetic plate 15 and the second magnetic plate 121 has the gap therebetween (not shown in the figure). For example, the gap can be filled with the curing glue. By adjusting a distance between the top magnetic plate 15 and the magnetic core column body 2, the coupling between the first magnetic element 11 and the second magnetic element 12 can be changed, thereby affecting the leakage inductance and changing the direction of the electromagnetic circuit.

Fourth Embodiment

Figure 6:
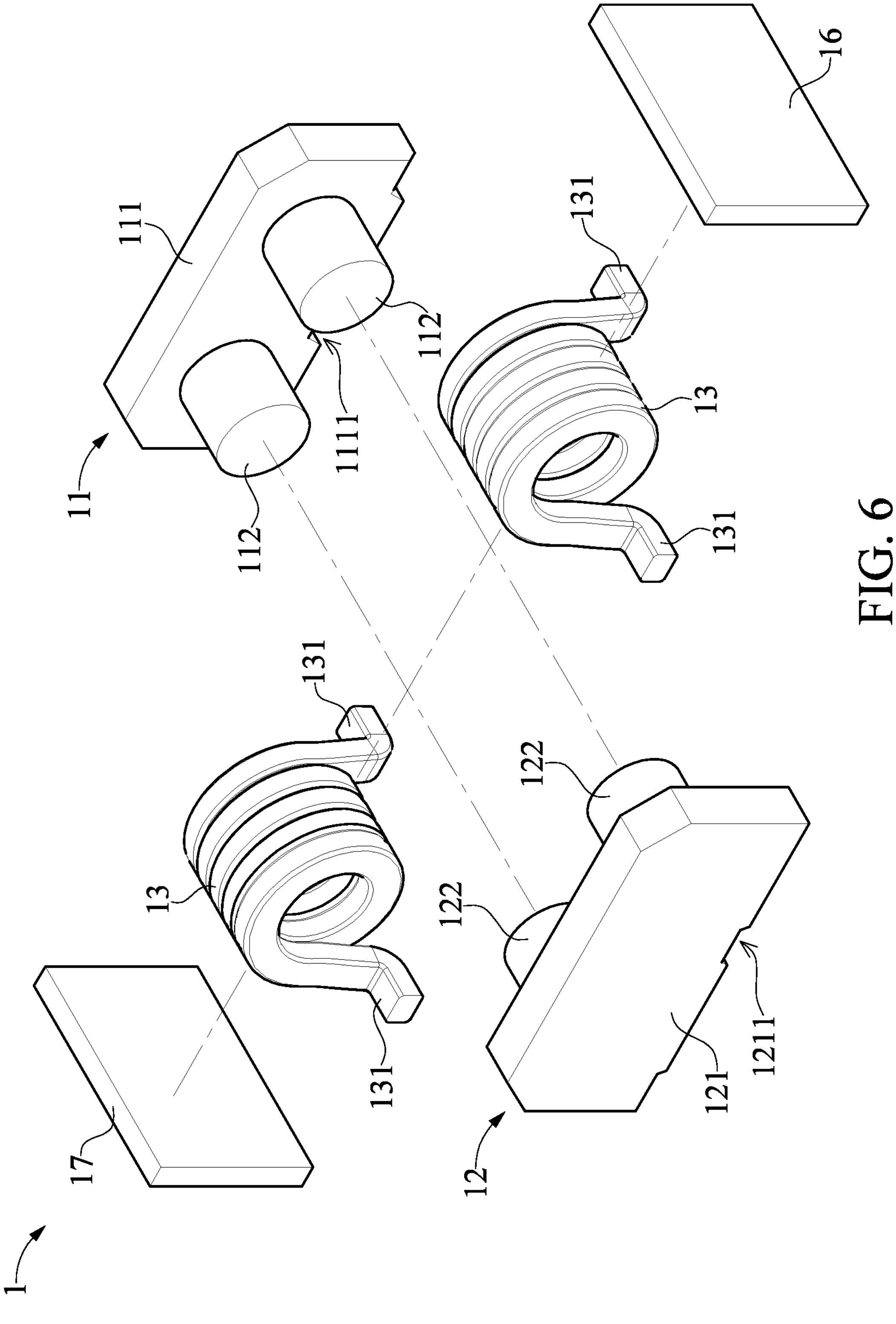
FIG. 6 is a schematic exploded view of a coupled inductor with adjustable leakage inductance according to a fourth embodiment of the present disclosure.
Figure 7:
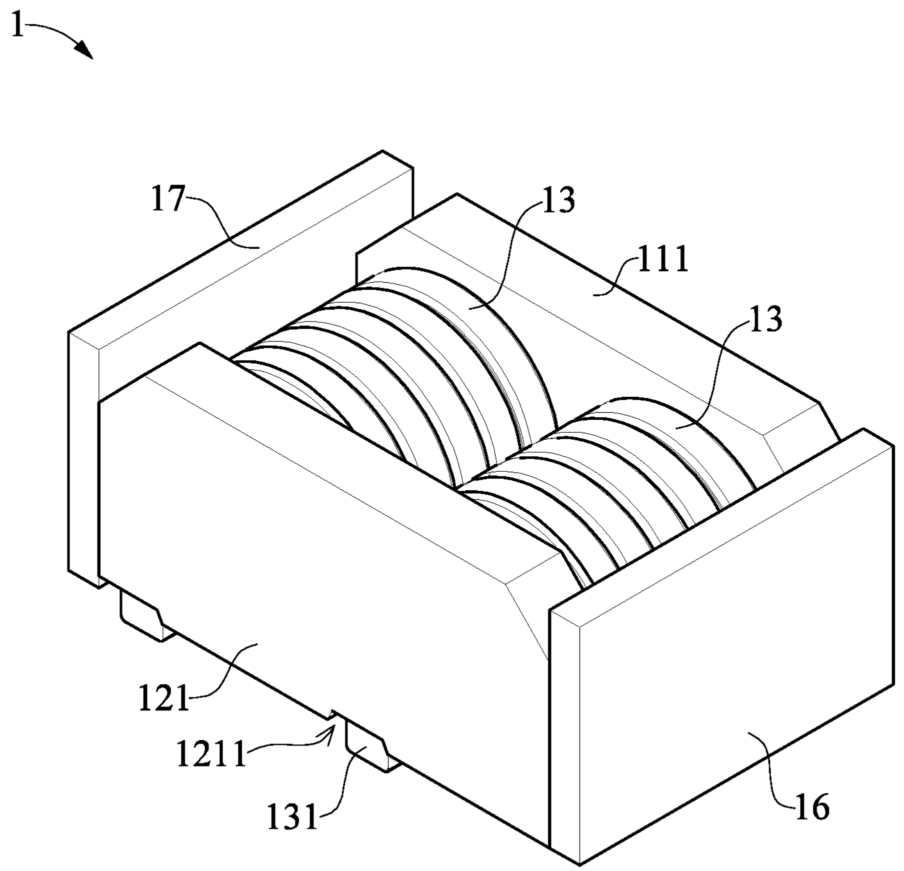
FIG. 7 is an assembled view of a coupled inductor with adjustable leakage inductance according to the fourth embodiment of the present disclosure.

Reference is made to FIG. 6 and FIG. 7, in which a schematic exploded view and a schematic assembled view of a coupled inductor with adjustable leakage inductance 1 according to a fourth embodiment of the present disclosure are respectively shown. According to the present embodiment, the coupled inductor with adjustable leakage inductance 1 further includes a third magnetic plate 16 and a fourth magnetic plate 17, and the third magnetic plate 16 is correspondingly disposed on a right side of the first magnetic element 11 and a right side of the second magnetic element 12. According to the present embodiment, two sides of the third magnetic plate 16 are respectively connected to the first magnetic plate 111 and the second magnetic plate 121. In addition, according to certain embodiments, one the two sides of the third magnetic plate 16 and the first magnetic plate 111 have the gap therebetween, and another one of the two sides of the third magnetic plate 16 and the second magnetic plate 121 has the gap therebetween (not shown). The fourth magnetic plate 17 is correspondingly disposed on a left side of the first magnetic element 11 and a left side of the second magnetic element 12. As shown in FIG. 7, in the present embodiment, two sides of the fourth magnetic plate 17 are respectively connected to the first magnetic plate 111 and the second magnetic plate 121. In addition, according to certain embodiments, one of the two sides of the fourth magnetic plate 17 and the first magnetic plate 111 have the gap therebetween, and another one of the two sides of the fourth magnetic plate 17 and the second magnetic plate 121 have the gap therebetween (not shown). By disposing the third magnetic plate 16 and the fourth magnetic plate 17 and adjusting a distance between the third magnetic plate 16 and the magnetic core column body 2 and/or a distance between the fourth magnetic plate 17 and the magnetic core column body 2, the coupling between the first magnetic element 11 and the second magnetic element 12 can be changed, thereby affecting the leakage inductance and changing the electromagnetic circuit.

Fifth Embodiment

Figure 8:
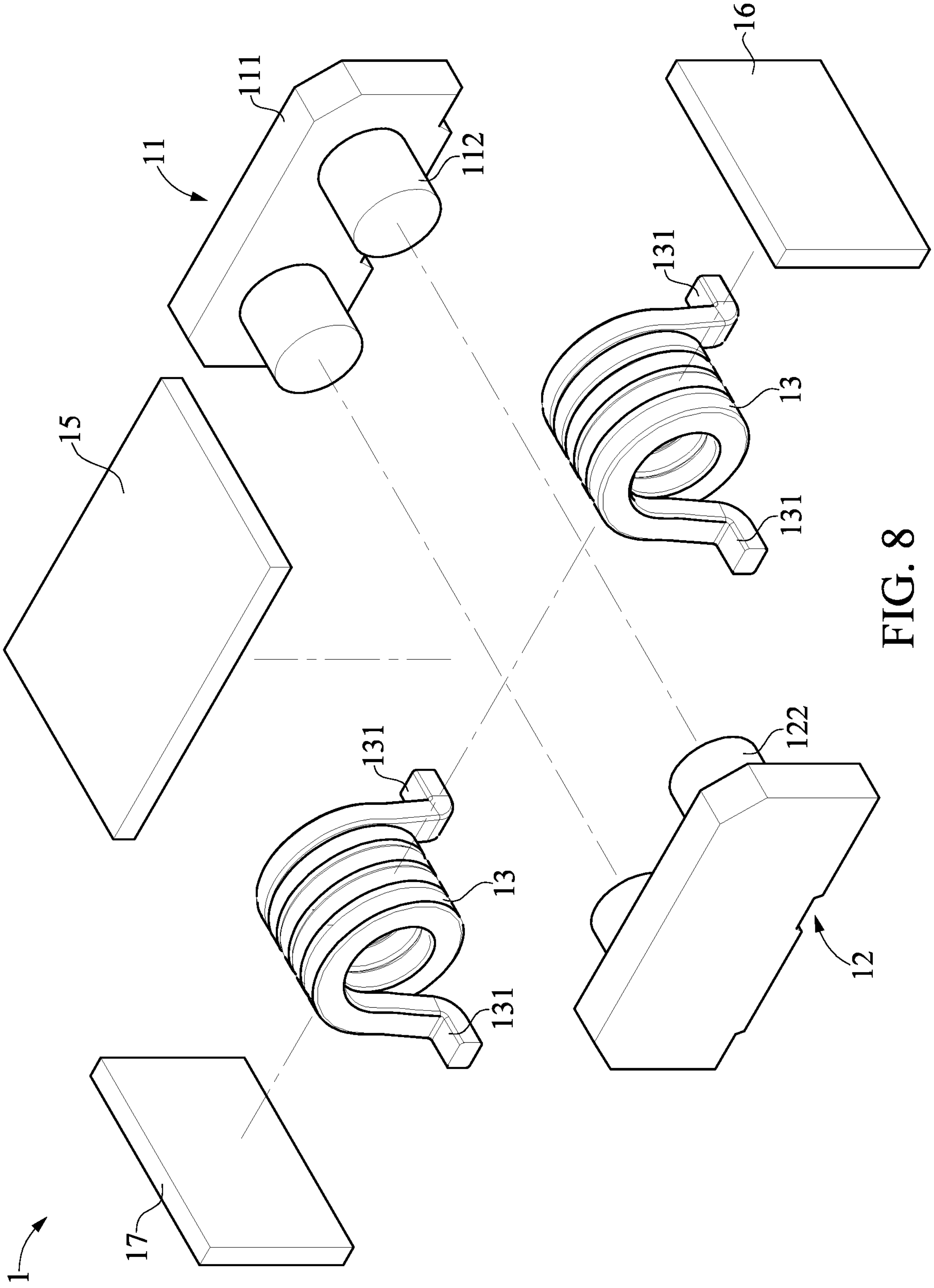
FIG. 8 is a schematic exploded view of a coupled inductor with adjustable leakage inductance according to a fifth embodiment of the present disclosure.

Referring to FIG. 8, FIG. 8 is a schematic exploded view of a coupled inductor with adjustable leakage inductance 1 according to a fifth embodiment of the present disclosure. According to the present embodiment, the coupled inductor with adjustable leakage inductance 1 further includes the third magnetic plate 16, the fourth magnetic plate 17, and the top magnetic plate 15. According to the embodiment shown in FIG. 8, a magnetic frame is defined by the first magnetic plate 111, the second magnetic plate 121, the third magnetic plate 16, and the fourth magnetic plate 17. The top magnetic plate 15 is disposed above the magnetic frame. The top magnetic plate 15 is optionally connected to the first magnetic plate 111 and the second magnetic plate 121 (with the gap). The top magnetic plate 15 is optionally connected to the third magnetic plate 16 and the fourth magnetic plate 17 (with the gap). Through a combination of the top magnetic plate 15, the first magnetic element 11, the second magnetic element 12, the third magnetic plate 16, and the fourth magnetic plate 17, and by adjusting a distance between the magnetic core column body 2 and each of the top magnetic plate 15, the first magnetic element 11, the second magnetic element 12, the third magnetic plate 16, and the fourth magnetic plate 17, the coupling of the first magnetic element 11 and the second magnetic element 12 can be changed, thereby affecting the leakage inductance and changing the direction of the electromagnetic circuit.

Sixth Embodiment

Figure 9:
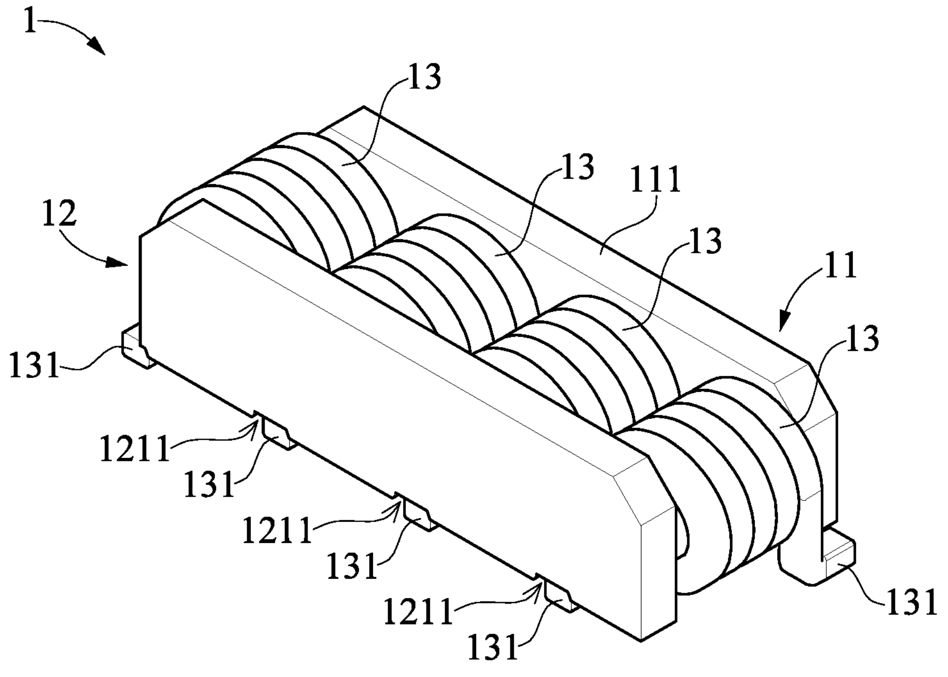
FIG. 9 is a schematic external view of a coupled inductor with adjustable leakage inductance according to a sixth embodiment of the present disclosure.

Referring to FIG. 9, FIG. 9 is a schematic external view of a coupled inductor with adjustable leakage inductance 1 according to a sixth embodiment of the present disclosure. According to the present embodiment, the coupled inductor with adjustable leakage inductance 1 includes multiple magnetic core column bodies 2, and the multiple magnetic core column bodies 2 are spaced apart along the arrangement direction D. Each of the multiple magnetic core column bodies 2 has the gap. A quantity of the magnetic core column bodies 2 and a quantity of the gap are not limited in the present disclosure, according to the leakage inductance and electromagnetic circuit required by users, a quantity of the magnetic core column bodies 2 can be selectively disposed, and a size and a quantity of the gap can be selectively designed, wherein the size of each of the gap can be the same or different.

Seventh Embodiment

Figure 10:
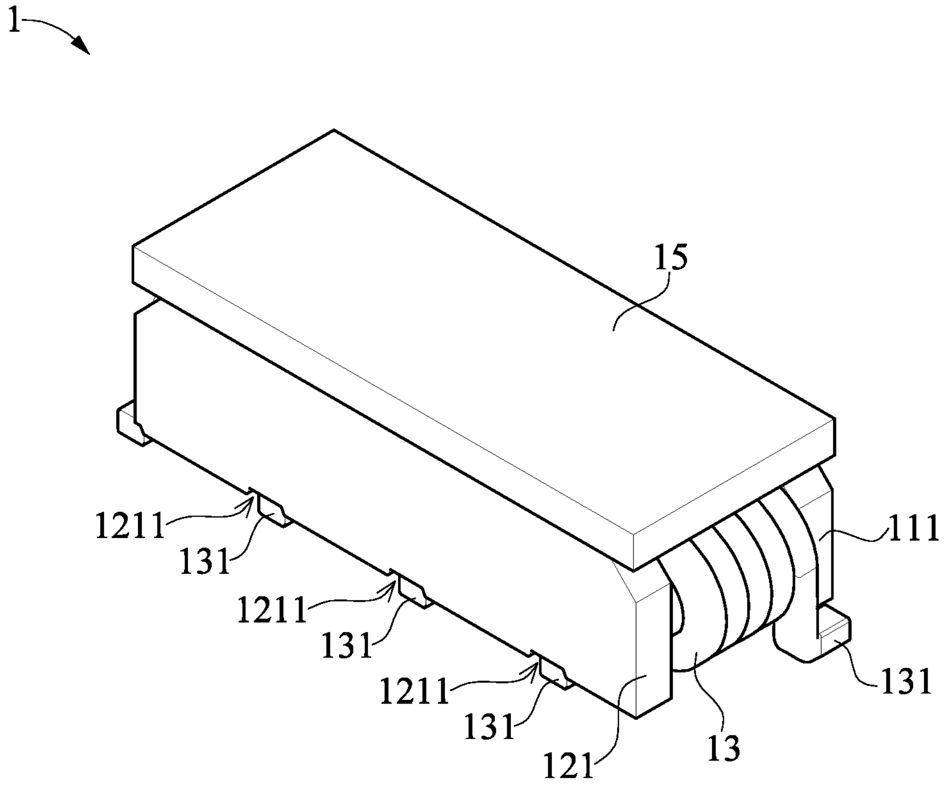
FIG. 10 is a schematic external view of a coupled inductor with adjustable leakage inductance according to a seventh embodiment of the present disclosure.

Referring to FIG. 10, FIG. 10 is a schematic external view of a coupled inductor with adjustable leakage inductance 1 according to a seventh embodiment of the present disclosure. The difference between the embodiment shown in FIG. 9 and the embodiment shown in FIG. 10 is that the coupled inductor with adjustable leakage inductance 1 shown in FIG. 10 also includes the top magnetic plate 15 correspondingly disposed above the first magnetic element 11 and the second magnetic element 12, and the top magnetic plate 15 can be optionally connected to the magnetic plate 111 and the second magnetic plate 121. When the top magnetic plate 15 is not connected to the first magnetic plate 111 and the second magnetic plate 121, the gap is not correspondingly formed between the top magnetic plate 15 and the first magnetic plate 111, and the second magnetic plate 121. By adjusting a distance between the top magnetic plate 15 and the multiple magnetic core column bodies 2, the coupling between the first magnetic element 11 and the second magnetic element 12 can be changed, thereby affecting the leakage inductance and changing the direction of the electromagnetic circuit.

Beneficial Effects of the Embodiments

One of the beneficial effects of the present disclosure is that, in the coupled inductor with adjustable leakage inductance provided by the present disclosure, by virtue of "the second magnetic core column being coupled to the first magnetic core column to form the magnetic core column body" and "so that the magnetic core column bodies in the coupling position has a gap", the coupled inductor with adjustable leakage inductance has the gap that can be adjusted in size, so as to affect the magnetic resistance of the coupled inductor, the effective magnetic permeability of the magnetic core, the leakage inductance, the magnetic induction current, the directionality of the electromagnetic circuit, and other electromagnetic factors. Therefore, the power and function of the applied electronic products can be improved, and a functional loss inside the electronic product can be reduced. Another beneficial effect is that through disposing the top magnetic plate 15, the third magnetic plate 16 and the fourth magnetic plate 17, each of the top magnetic plate 15, the third magnetic plate 16 and the fourth magnetic plate 17 is optionally connected to the first magnetic element 11 and the second magnetic plate 121, and by adjusting a distance between the magnetic core column body 2 and each of the top magnetic plate 15, the first magnetic element 11, the second magnetic element 12, the third magnetic plate 16, and the fourth magnetic plate 17, the coupling of the first magnetic element 11 and the second magnetic element 12 can be changed, thereby affecting the leakage inductance and changing the direction of the electromagnetic circuit.

The disclose content above is only the preferred feasible embodiment of the present disclosure, and is not therefore limiting the patent scope of the present disclosure, so all equivalent technical changes made by using the description of the present disclosure and the contents of the drawings are included in this document within the scope of the patent application.

What is claimed is:

1. A coupled inductor with adjustable leakage inductance, comprising:

- a first magnetic element, including:
  - a first magnetic plate; and
  - at least two first magnetic core columns, wherein the at least two first magnetic core columns are disposed on the first magnetic plate and spaced apart along an arrangement direction;
- a second magnetic element, wherein the second magnetic element is coupled to the first magnetic element, and the second magnetic element includes:
  - a second magnetic plate; and
  - at least two second magnetic core columns, wherein a quantity of the second magnetic core columns is the same as a quantity of the first magnetic core columns, the at least two second magnetic core columns are disposed on the second magnetic plate, and spaced apart along the arrangement direction, and are respectively coupled to the at least two first magnetic core columns to form at least two magnetic core column bodies; and
- at least two coil assemblies, wherein a quantity of the at least two coil assemblies is the same as a quantity of the at least two magnetic core column bodies, and the at least two coil assemblies are respectively sleeved around the at least two magnetic core column bodies;
- wherein a coupling position between each of the second magnetic core columns and a corresponding one of the first magnetic core columns has a gap, and the gap is formed between a bottom end surface of the first magnetic core column and a top end surface of the corresponding second magnetic core column.

2. The coupled inductor according to claim 1, further comprising a top magnetic plate, wherein the top magnetic plate is correspondingly disposed above the first magnetic element and the second magnetic element.

3. The coupled inductor according to claim 1, further comprising a third magnetic plate and a fourth magnetic plate, wherein the third magnetic plate is correspondingly disposed on a right side of the first magnetic element and a right side of the second magnetic element, and the fourth magnetic plate is correspondingly disposed on a left side of the first magnetic element and a left side of the second magnetic element.

4. The coupled inductor according to claim 1, further comprising:

- a third magnetic plate, wherein the third magnetic plate is correspondingly disposed on a right side of the first magnetic element and a right side of the second magnetic element;
- a fourth magnetic plate, wherein the fourth magnetic plate is disposed on a left side of the first magnetic element and a left side of the second magnetic element, and a magnetic frame is jointly defined by the first magnetic plate, the second magnetic plate, the third magnetic plate, and the fourth magnetic plate; and
- a top magnetic plate, wherein the top magnetic plate is disposed above the magnetic frame.

5. The coupled inductor according to claim 1, wherein a coil of each of the at least two coil assemblies is a flat coil or a circular coil.

* * * * *